United States Patent
Rosi et al.

(10) Patent No.: US 6,580,993 B2
(45) Date of Patent: Jun. 17, 2003

(54) PROCESS FOR ADAPTING AUTOMATIC TRANSMISSION SHIFTINGS

(75) Inventors: Hansjörg Rosi, Meckenbeuren (DE); Wolfgang Netzer, Kressbronn (DE); Klaus Steinhauser, Kressbronn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/008,249

(22) Filed: Nov. 8, 2001

(65) Prior Publication Data

US 2002/0062188 A1 May 23, 2002

(30) Foreign Application Priority Data

Nov. 17, 2000 (DE) .......................... 100 57 093

(51) Int. Cl.$^7$ ................................ G06F 19/00
(52) U.S. Cl. ................ 701/56; 701/51; 477/34; 477/155
(58) Field of Search ............... 701/51, 56; 477/143, 477/154, 155, 34

(56) References Cited

U.S. PATENT DOCUMENTS

| 5,812,957 A | | 9/1998 | Iizuka .......................... 701/58 |
| 6,095,948 A | * | 8/2000 | Depping et al. ............ 477/143 |
| 6,375,233 B1 | * | 4/2002 | Friedmann et al. ......... 285/272 |

FOREIGN PATENT DOCUMENTS

| DE | 195 01 315 C1 | 4/1996 | ......... F16H/59/18 |
| DE | 195 44 940 C2 | 5/2001 | ......... F16H/61/02 |
| DE | 199 54 921 A1 | 6/2001 | ......... F16H/61/12 |
| DE | 199 59 891 A1 | 6/2001 | ......... F16H/59/50 |

* cited by examiner

*Primary Examiner*—Gertrude Arthur
(74) *Attorney, Agent, or Firm*—Davis & Bujold, P.L.L.C.

(57) ABSTRACT

Described is a process for the adaption of the shifting operation of an automatic transmission. Accordingly, a determination of adaption values is made relative to occurrences shifting quality in the operation of an automatic transmission, and said determined values are stored in the memory of an adaption storage and can be accessed for the control of shifting operations. The determined adaption values prior to the storage in the adaption memory are corrected in respect to a lifetime loading of the automatic transmission.

19 Claims, 1 Drawing Sheet

PROCESS FOR ADAPTING AUTOMATIC TRANSMISSION SHIFTINGS

FIELD OF THE INVENTION

The invention concerns a process for the adaption of the shifting operation in an automatic transmission.

BACKGROUND OF THE INVENTION

In the case of processes known to the practice, regarding adaption of the shifting operations in an automatic transmission, a determination has been made of adaption values dependent upon shift related occurrences in operation of the automatic transmission. These adaption values were stored in a memory of an electronic control unit to be accessed for the control of gear changes.

Such adaption storage was designated as a characteristic map. Such a map, generally, exhibits two different axes, upon which the adaption values of the said map are apportioned into various classes. Since, in the operation of an automatic transmission, many different application cases happen, the adaption process is framed as intelligent and evaluates external occurrences for the improvement of the quality of shifting. After each happening, that is each shift operation, a determination is made, as to whether the shifting was executed in the optimum manner, or if deviations from a predetermined sequence of shifting operations has occurred.

Governed by monitoring, the adaption map, i.e. the adaption memory, is made to accept that said occurrence at the respective operating point associated therewith. Or on the other hand, the said memory may experience no change at all.

In general, in the case of automatic transmission shifting operations, engagement and disengagement of the shift elements, namely the clutches, are carried out in accord with pressure curves as predetermined in an electronic control unit. An exact control, that is to say, regulation of the clutches by means of the pressure curves, especially in the case of shifting sequences in the course of the overlap procedure, is integrally responsible for shifting comfort. Processes have been introduced to improve shifting operation, for regulation or control of the said pressure curve variation which are similar to a modified power-shift, or a regulated load take-over. Under these circumstances, the said pressure curves for the clutch operation are broken into a plurality of incremental pressures.

Correction values for these pressure curve variations are input into the predetermined adaption map, dependent upon various parameters, such as, the torque of the input drive and the temperature of the automated transmission, and the speed of rotation of the input drive. These values are incrementalized into classes of torque, and/or temperature and/or rotational speed. The magnitude of the pressure provided through the adaption map takes on the responsibility for undesirable deviations in the shifting action, which, for example, occur because of component tolerances, frictional value changes of the clutch liners, and mechanical wear in the automatic transmission. Also the programming based on the adaption map compensates for the shifting action, which deteriorates with operational time. On this account, for each shift operation executed, that is, a shifting procedure of the automatic transmission by an electronic transmission control, a determination is made by said control, as to whether or not the shifting time was too long, too short, or just right, or whether the specific moment for an awaited speed of rotation was, again, too soon, too late or correct. If, the determination is made in the electronic controller, that an evaluated run of shifting deviates from a specified run of shifting, then the adaption map will be made to conform thereto.

This procedure achieves the goal, that during the increasing of the operational period, very exact adaption maps come into being which react to changing due to wear or aging in the automatic transmission.

However, the disadvantageous aspect of this is, that for the determination of the adaption values, first, a plurality of computer accesses must be made into one of the evaluation storages ahead of the adaption map, until a value of field of an evaluation storage has reached a so-called overflow value, which, finally, can be recorded, i.e. stored in the true adaption map, or be added thereto as a basic value of the adaption map. These steps do not enable a rapid adaption, since first, several of the shifting operations which deviate from the predetermined shifting operation must be carried out, before a final adaption value is available, that is, before a determined adaption value can be employed as a compensation of the deviations.

The continually growing demands on the functionality of the automatic transmission are already at a new level, due to an increased call for gear shifting quality, requirements for more spontaneity, and also because of the increasing number of ratios into which must be shifted. What these demands predominately call for at motor start-up i.e., when the automatic transmission begins to operate, is an immediate action of a quick responding adaption system, to quickly optimize shifting, at least partially, by means of taking advantage of increased tolerance limits. Contrary to this, there is also the requirement, as the running time of the automatic transmission increases, not to provide too radical steps in adaption, since such steps are not likely to be compatible with the adaption, and thus by erroneous interpretation, subsequently erroneous reactions occur with faulty consequences for the adaption.

In order to avoid the disadvantages which accompany the adaption process, as well to properly meet the demands on the functionality of the automatic transmission, the practice has evolved so-called special functions, or forced adaptions, especially triggered by wide discrepancies in the performance of the shifting operation and the large adaption steps which result therefrom. These kinds of special functions react, however, even in an already well ordered situation, by allowing one-time failing reactions of the automatic transmission that is to say, improper interpretations of the adaption process. These reactions, lead in turn, to poorer shifting, until the adaption system back-tracks and corrects these erroneously adapted value by means of the above described "normal" run of the evaluation storage.

Thus, the purpose of the present invention is to make available, a process for the adaption of a shifting operation in an automatic transmission, by means of which, a quickly reacting adaption system is created and in the steady running adaption condition during the operational time of the automatic transmission, erroneous adaptions are avoided to greatest possible extent.

SUMMARY OF THE INVENTION

The invented process for the adaption of the shifting operation of an automatic transmission offers the advantage, that the determined adaption values before the storage in the adaption memory, are corrected, based upon a lifetime loading of the automatic transmission and thus can be made to fit the given demands and requirements during the entire lifetime of an automatic transmission. This advantage particularly comes to the fore, in that, in the case of a "new automatic transmission", at first, greater adaption steps are carried out and the factually determined adaption values are made to conform, with consideration given to the lifetime loading of the automatic transmission.

Under the term "lifetime load" is to be understood, that the running time, or the operational period of the automatic transmission, along with the kilometer accruals and the number of shifts made are incorporated into the adaption, that is to say, into the determination of the adaption values. With this procedure, assurance can be given, that, as operational time increases, a self-sustaining steady running condition of the adaption is brought about and a good, progressive adaption situation is established. This is accomplished without compromising the satisfactory adaption by determined adaption values with step values which are too broad being accepted by the adaption memory only after subjection to a correction, taking into consideration the lifetime load.

Further an advantage is found therein, that with the correction of the adaption value for a known process, an evaluation memory, placed ahead of the adaption value storage, can be dispensed with, so that even upon increasing operational time, a quick adaption of the shifting operation can be executed, without the danger of an undesirable disturbance delaying a smooth running adaption system.

BRIEF DESCRIPTION OF THE DRAWING

The invention will now be described, by way of example, with reference to the accompanying drawings in which.

DETAILED DESCRIPTION OF THE INVENTION

In FIG. is presented a flow diagram of the adaption process in accord with the invention, for the adaption of shifting operations of an automatic transmission, wherein, during the process, depending upon the most different occurrences which affects shifting quality in the operation of the automatic drive, a determination of adaption value is made, which is store in an adaption memory, i.e., store in an adaption map of an electronic control unit. After such storage, the said value can be called upon for the adaption of a control of the performance of the shifting action. The adaption storage is subdivided into different classes, the divisional apportioning of which is effected in dependency of the drive torque of the automatic transmission and/or a transmission temperature and/or the speed of rotation of the input to the transmission.

In step S1, the operational point of the automatic transmission—i.e. the corresponding clutch—is determined for an actually executed operation of gear shifting and the thereto corresponding class in the adaption memory is defined.

In a Step 2, which is connected to, but subsequent to Step 1, an adaption value is determined, with consideration, given to the progressive operation of the actual shifting. This value is next corrected in a step 3 by a value which allows the determination of the actual operational point, dependent this time on an existing and available lifetime loading value of the automatic transmission. The correction of the determined adaption value in the Step 3 is made on the basis of a characteristic graph 1 shown in FIG. 2. This curve in FIG. 2 is a plotted as a damping factor characteristic.

Figure 1:
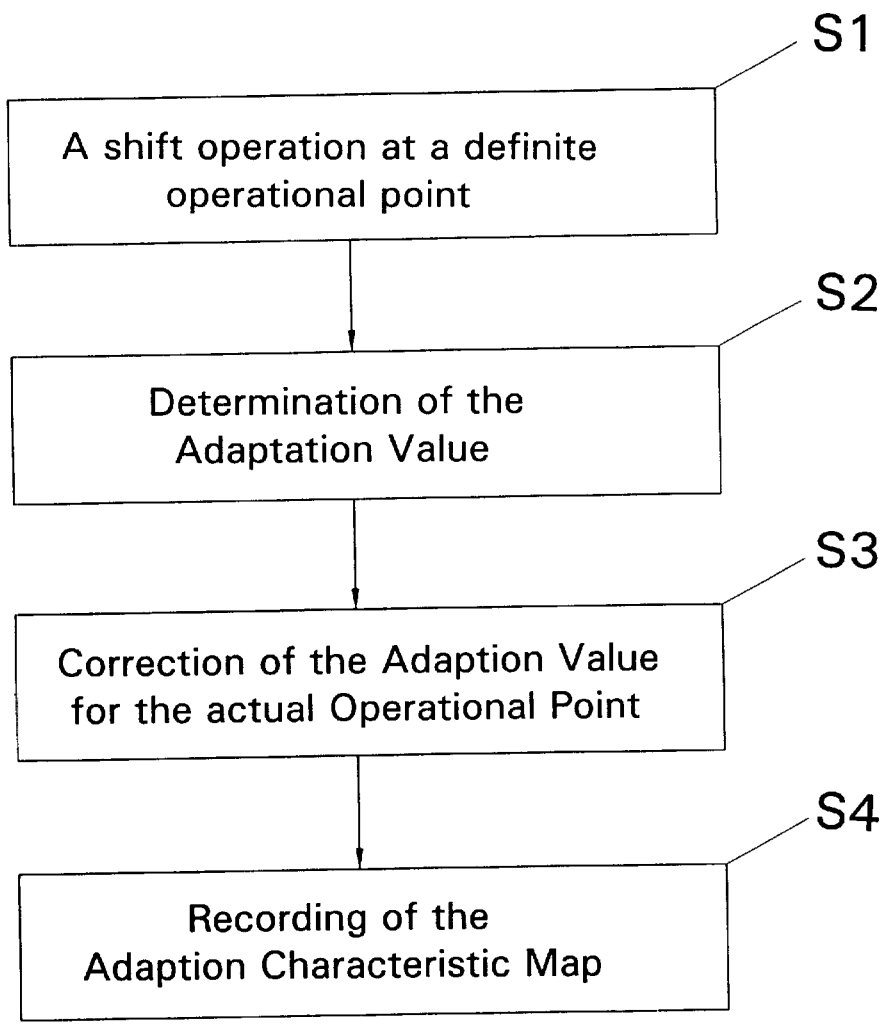
FIG. 1 a flow diagram of the adaption process in accord with the invention.
Figure 2:
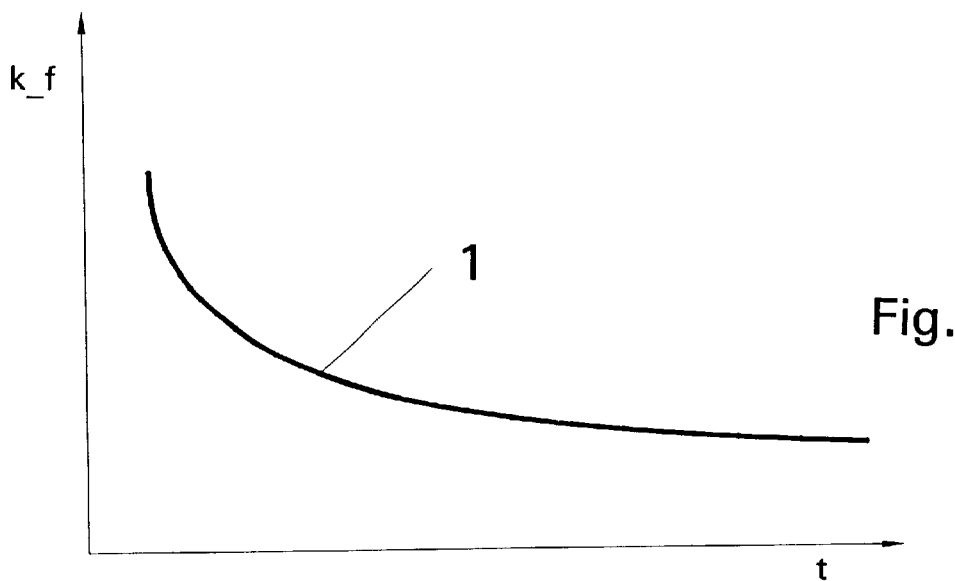
FIG. 2 a characteristic curve of damping, as a function of the lifetime loading, from which correction factor can be determined for use in correcting a value for the adaption value.

After the above correction of the adaption value has been carried out, by means of a correction factor k, taken from the damping curve 1 shown in FIG. 2, the corrected adaption value is accepted by the adaption memory in Step 4 of the flow diagram of FIG. 1. The said value is saved in the adaption memory for a later run of shifting at the same or similar operating point for the adaption of that shifting sequence of operations in the automatic transmission.

The damping characteristic curve shown in FIG. 2 presents a function of the lifetime loading, wherein, in the determination of the said characteristic line, most specially, the running time of the automatic transmission, the kilometer accrual, as well as the number of gear shift operations carried out are all considered as inputs.

Alternative to this, provision can be made, that the correction factor can be determined by means of a computation model available in the electronic control unit, which considers the actual lifetime loading, and can be called up for the correction of the immediately current operational point of the determined adaption value of the automatic transmission.

Moreover, provision can also be made, that the correction factor can be determined by a map input into the electronic control unit, wherein the said map makes available a function of the most different operational parameters of the automatic transmission. Such operational parameters for the automatic transmission can be frictional values of clutches and/or brakes, temperature effects on the shifting behavior, component tolerances, and load dependent component abrasion.

The damping characteristic curve as presented in FIG. 2, indicates a continually declining damping curve as the running time duration t increases, whereby an intended damping of the determined correction factor $k_f$, as operation continues, is effected and the therewith connected corrected adaption value is correspondingly computed. By means of the continuing declining of the correction factor $k_f$, adaption values, determined on the base of a well advanced operational lifetime loading period, are reduced. Thereby, a disturbance is avoided, which would arise from a well developed adaption memory due to increasing time of operation and hence extending over the entire adaption system.

If, because of several successively running shifting operations at the same operational points of the automatic transmission, a multiplicity of unreliably high adaption values are determined, which for instance give indication of an unacceptably high component wear of the automatic transmission, which cannot be compensated for by the existing adaptions for an emergency operation of the said automatic transmission, then a special vehicle driving program utilizing an emergency running of the automatic transmission is started, in order to prevent any further damage of the automatic transmission, and possibly allow an extension of travel to the nearest workshop.

During the process, an evaluation is made of an already determined, and then corrected, adaption value as to its relation to a defined maximum adaption value dependent on the present operational point of the automatic transmission.

If, during the procedure of a shifting operation, an occurrence is ascertained, which would negatively affect the quality of shifting, then, during the adaption process for the present operational point of the transmission, which is correlated with a definite classification for temperature, speed of rotation and drive torque in the adaption memory, an adaption value is defined and corrected by the determined correction factor $k_f$. The acceptance of the corrected determined adaption value in the adaption memory for the selected, involved adaption class, leads to a suitability of the classes of the adaption memory, which encompasses the actual, presently determined adaption class.

In this way, by the said encompassing adaption classes of the adaption storage, immediately a pre-fit in dependency of the corrected determined adaption value is undertaken, so that in the case of the next direct computer accessing of one of these encompassing classes, the adaption is carried through on a correspondingly higher level, whereby the time up to the reaching of a good adaption condition is substantially shortened.

The effect for the determination of an adaption value for a definite adaption class on the encompassing adaption classes is done by means of a computing algorithm in the electronic control unit, whereby the consideration of the determined, corrected adaption value on the encompassing adaption classes is done only in a partial amount of the determined corrected adaption value, that is to say, in damped form, in relation to the characteristic adaption value.

Reference Numbers

1 Damping characteristic line
kf Correction Factor
S1 to S4 Steps in invented process
t Temperature

What is claimed is:

1. A process for the adaptior of a shifting operation in an automatic transmission the process comprising the steps of:
   determining adaption values depending on shifting quality occurrences in the operation of the automatic transmission;
   inputting the adaption values to an adaption memory of an electronic control unit; and
   accessing the adaption values and controlling the shifting operation of the automatic transmission according to the adaption values;
   determining a lifetime load applied to the automatic transmission;
   correcting the adaption values, based on the lifetime load of the automatic transmission, before inputting the adaption values to the adaption memory.

2. The process according to claim 1, further comprising the step of correcting the determined adaption value according to correction factors ($k_f$) which can be determined in an electronic control unit.

3. The process according to claim 2 further comprising the step of determining the correction factors ($k_f$) based on a pre-programmed characteristic curve (1) in the electronic control unit.

4. The process according to claim 3 further comprising the step of adjusting the pre-programmed characteristic curve (1) as a function of the lifetime load.

5. The process according to claim 2 further comprising the step of determining the correction factors ($k_f$) according to a pre-programmed computation model in the electronic control unit.

6. The process according to claim 2 further comprising the step of determining the correction factors ($k_f$) by a pre-programmed map in the electronic control unit, wherein the said map is a function of different operational parameters of the automatic transmission.

7. The process according to claim 1 further comprising the steps of subdividing the adaption memory into various adaption classes, each class comprising inputs of at least one of drive torque, speed of rotation, and temperatures of the automatic transmission, and, whereby a previously stored adaption value in the relative adaption class is altered according to a newly determined and corrected adaption value.

8. The process according to claim 4 further comprising the step of evaluating a determined and corrected adaption value, as compared to a defined maximum adaption value based on the evaluated operational point of the automatic transmission.

9. The process according to claim 8 further comprising the step of activating a special driving program in the case of an adaption value greater than a predefined maximum adaption value.

10. The process according to claim 2 further comprising the step of the numerical value of the correction factor ($k_f$) decreasing as the lifetime load of the automatic transmission increase.

11. A process for the adaption of a shifting operation in an automatic transmission the process comprising the steps of:
    determining adaption values depending on shifting quality occurrences in the operation of the automatic transmission;
    inputting the adaption values to an adaption memory of an electronic control unit;
    accessing the adaption values and controlling the shifting operation of the automatic transmission according to the adaption values;
    determining a lifetime load applied to the automatic transmission;
    obtaining correction factors ($k_f$) as a function of the lifetime load in an electronic control unit; and
    correcting the adaption values according to the correction factors ($k_f$) determined from the lifetime load, to obtain new adaption values before inputting the new adaption values to the adaption memory.

12. The process according to claim 11 further comprising the step of obtaining the correction factors ($k_f$) from a characteristic curve (1) of the lifetime load as a function of time in the electronic control unit.

13. The process according to claim 12 further comprising the step of continuously adjusting the characteristic curve (1) as a function of the lifetime load.

14. A process for the adaption of a shifting operation in an automatic transmission the process comprising the steps of:
    evaluating a lifetime load applied to the automatic transmission and storing the lifetime load as a damping characteristic curve in an electronic control unit by the steps of;
    determining adaption values depending on shifting quality occurrences in the operation of the automatic transmission;
    correcting the adaption values according to correction factors ($k_f$) determined from the damping characteristic curve of the lifetime load, to obtain corrected adaption values;
    accessing the corrected adaption values and controlling the shifting operation of the automatic transmission according to the corrected adaption values; and
    updating the lifetime load damping characteristic curve according to the corrected adaption values.

15. The process according to claim 14 further comprising the step of obtaining the correction factors ($k_f$) from the characteristic curve (1) of the lifetime load as a function of time.

16. The process according to claim 15 further comprising the steps of providing an adaption memory in the electronic control unit and subdividing the adaption memory into various adaption classes, each class comprising inputs of at least one of drive torque, speed of rotation, and temperatures of the automatic transmission, and, whereby a previously stored adaption value in there relative adaption class is altered to a newly determined and corrected adaption value.

17. The process according to claim 16 further comprising the step of, in each class, evaluating the corrected adaption value, as compared to a defined maximum adaption value based on the evaluated operational point of the automatic transmission.

18. The process according to claim 17 further comprising the step of activating a special driving program in the case of an adaption value greater than a predefined maximum adaption value.

19. The process according to claim 18 further comprising the step of the numerical value of the correction factor ($k_f$) decreasing as the lifetime load of the automatic transmission increase.

* * * * *